US007124011B2

(12) United States Patent
Baxter et al.

(10) Patent No.: US 7,124,011 B2
(45) Date of Patent: Oct. 17, 2006

(54) ENGINE CONTROL MODULE AND METHOD FOR USE IN ENGINE SYSTEM MANUFACTURE

(75) Inventors: James Michael Baxter, Waukesha, WI (US); Lori J. Welch, Waukesha, WI (US)

(73) Assignee: Dresser, Inc., Addison, TX (US)

( * ) Notice: Subject to any disclaimer, the term of this patent is extended or adjusted under 35 U.S.C. 154(b) by 79 days.

(21) Appl. No.: 10/922,553

(22) Filed: Aug. 20, 2004

(65) Prior Publication Data

US 2006/0041371 A1 Feb. 23, 2006

(51) Int. Cl.
*G06F 19/00* (2006.01)
*G06F 1/00* (2006.01)

(52) U.S. Cl. ....................................... 701/101; 701/115

(58) Field of Classification Search ................ 701/101, 701/102, 103, 115
See application file for complete search history.

(56) References Cited

U.S. PATENT DOCUMENTS 4,912,657 A * 3/1990 Saxton et al. ............... 715/853
5,077,674 A 12/1991 Tischler et al.
5,548,698 A * 8/1996 Smith et al. ................ 345/660
5,884,202 A 3/1999 Arjomand
5,999,876 A 12/1999 Irons et al.
6,094,609 A 7/2000 Arjomand
6,317,727 B1 * 11/2001 May ......................... 705/36 R
6,356,824 B1 3/2002 Chene et al.
6,421,653 B1 * 7/2002 May ......................... 705/36 R
6,625,504 B1 9/2003 Landreth
6,778,979 B1 * 8/2004 Grefenstette et al. .......... 707/3
2004/0056619 A1 3/2004 Jonsson et al.

FOREIGN PATENT DOCUMENTS

DE 10204247 8/2003
EP 1246345 10/2002
EP 1339014 8/2003

OTHER PUBLICATIONS

Website, Symbol®, Handheld Barcode Scanners, http://www.symbol.com/products/barcode_scanners/barcode_handheld.html, printed Dec. 8, 2004, 4 pages.

* cited by examiner

*Primary Examiner*—John T. Kwon
(74) *Attorney, Agent, or Firm*—Fish & Richardson P.C.

(57) ABSTRACT

An engine control module is associated with a particular engine system, and used to store information concerning manufacturing instructions for manufacturing the engine system and as-built information about the particular engine system. The engine control module also stores engine system operating instructions operable to enable the engine control module to control one or more aspects of the engine system operation.

41 Claims, 3 Drawing Sheets

ENGINE CONTROL MODULE AND METHOD FOR USE IN ENGINE SYSTEM MANUFACTURE

TECHNICAL FIELD

This invention relates to manufacturing engine systems, and more particularly to communication of information in manufacturing an engine system.

BACKGROUND

Because of the large number of components in an engine system and the relative complexity of each step in the manufacturing process, there is a need to methodically manage and communicate information relating to the engine system's manufacture throughout the manufacturing process. Managing and communicating this information between the numerous steps in manufacturing is complex. The complexity is compounded in a manufacturing process that manufactures different configurations of engine systems using the same manufacturing stations, because information concerning each engine system configuration must be communicated between the stations and coordinated with the engine system configurations. The complexity is further compounded when engine systems of a particular general configuration are customized to be unique from others of the same general configuration. For example, a manufacturing facility may manufacture three different models of engine systems that differ in general configuration, and within each of the three different models, particular ones may be customized to specific customer specifications. Ensuring that a particular engine system is built according to its specified configuration and further customized as requested by the customer requires detailed documentation and a system by which the information is communicated throughout the manufacturing process to the proper workers.

Furthermore, there is a desire to have documentation describing the engine system as-built. Such as-built information adds to the volume of information and the difficulty of maintaining a system by which the information is communicated throughout the manufacturing process.

Therefore, there is need to manage information relating to an engine system's manufacture and its communication throughout the manufacturing process.

SUMMARY

The present disclosure is directed to a system and method of communicating information relating to an engine system's manufacture throughout the manufacturing process.

In one illustrative implementation an engine control module is associated with a particular engine system. Information concerning at least one of manufacturing instructions for manufacturing the engine system and as-built information about the particular engine system is stored in a memory of the engine control module. Engine system operating instructions are stored in a memory of the engine control module. The engine system operating instructions are operable to enable the engine control module to control one or more aspects of the engine system operation.

In another illustrative implementation an engine control module is associated with a particular engine system, build instructions relating to manufacturing the particular engine system are stored in a memory of the engine control module, and at least a portion of the build instructions are retrieved from the engine control module. The particular engine system is then manufactured according to the retrieved build instructions.

In another illustrative implementation an engine control module is associated with a particular engine system, the engine system is manufactured, and concurrently with manufacturing the engine system, as-built information related to the manufacture of the engine system is stored in a memory of the engine control module.

In yet another illustrative implementation an engine control module includes a memory and a processor. The processor is configured to perform operations including, associate the engine control module with a particular engine system, store information concerning at least one of manufacturing instructions for manufacturing the engine system and as-built information about the engine system in the memory of the engine control module, and store engine system operating instructions in a memory of the engine control module. The engine system operating instructions are operable to enable the engine control module to control one or more aspects of the engine system operation.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
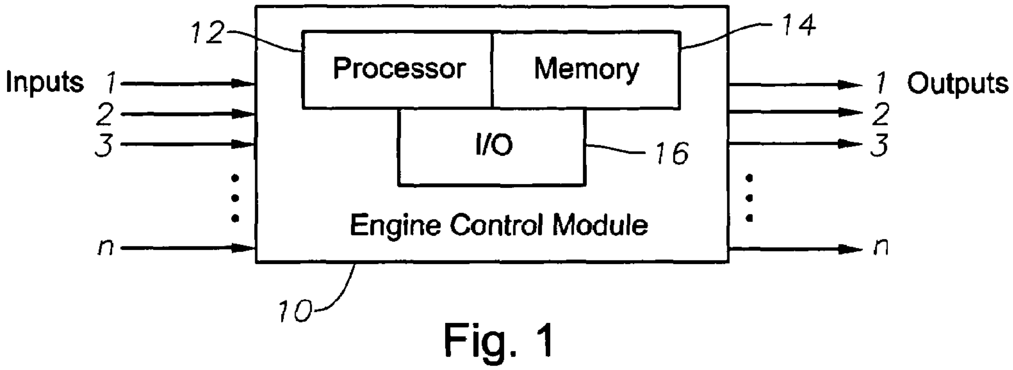
FIG. 1 schematically depicts an engine control module (ECM) in accordance with the invention.

Referring first to FIG. 1, an engine control module (ECM) 10 according to the invention includes a processor 12 operably coupled to a computer readable medium or memory 14. The computer readable medium 14 may be wholly or partially removable from the ECM 10. The computer readable medium 14 contains instructions used by the processor 12 to operate as described herein. The ECM 10 can receive one or more input signals ($input_1 \ldots input_n$) and can output one or more output signals ($output_1 \ldots output_n$) via an input/output (I/O) interface 16 coupled to at least one of the processor 12 and the memory 14.

Figure 2:
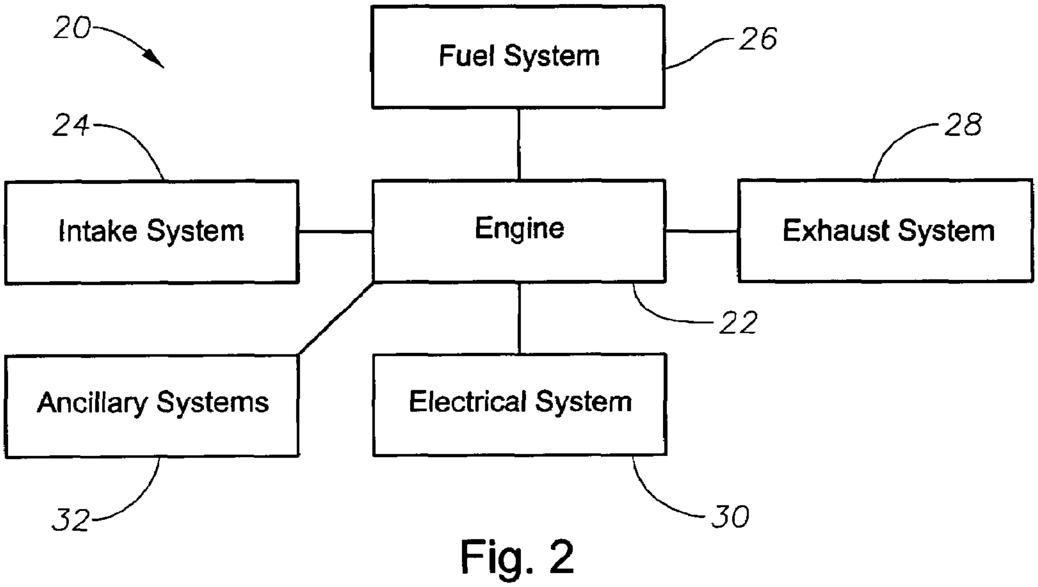
FIG. 2 schematically depicts an engine system in accordance with the invention.

Referring to FIG. 2, an engine system 20 according to the invention includes an engine 22, an intake system 24, a fuel system 26, an exhaust system 28, and an electrical system 30. The engine 22 includes the multiple components that make up an internal combustion engine. Some exemplary engine 22 components include a block, a crank, piston rods, pistons, a head, a cam, cam rockers, valves, rocker boxes, a cooling system pump and heat exchanger, and various bearings, retainers, and clips. The engine 22, although described herein in reference to a reciprocating piston engine, can include various configurations of engines, such as a rotary engine or turbine.

The intake system 24 includes one or more components related to supplying air and a combustion mixture (i.e. air and fuel) to the engine 20. Some exemplary intake system 24 components include, intake ducting that directs air or a combustion mixture of air and fuel into the engine 20, a throttle valve that meters flow through the intake ducting, a turbocharger that operates to increase the pressure of the flow through the intake ducting, and a pressure valve that operates to selectively vent pressure in the intake ducting.

The fuel system 26 includes one or more components related to supplying fuel to the engine 20. Some exemplary fuel system 26 components include fuel lines, an air-gas mixer that meters flow of fuel into air in the intake ducting to form the combustion mixture, fuel injectors that inject metered amounts of fuel into the engine 20, a fuel pressure valve that modulates the fuel pressure supplied to the air-gas mixer and/or fuel injectors, and a fuel pump that pumps fuel from a fuel source.

The exhaust system 38 includes one or more components related to routing exhaust from the engine 20. Some exemplary exhaust system 28 components include exhaust ducting, an exhaust manifold that collects exhaust from multiple outlets of the engine and routes it to the exhaust ducting, a turbocharger wastegate valve that bypasses exhaust around the turbocharger, a catalyst that operates in removing undesirable elements of the engine's exhaust, and a muffler to reduce the sound output of the engine's exhaust.

The electrical system 30 includes one or more components for operating the various engine subsystems in concert to operate the engine, as well as, in some instances, an ignition system that operates to igniting the engine's combustion mixture. The ECM 10 (FIG. 1) is a component of the electrical system 30. Some additional exemplary electrical system 30 components include the controllers other than the ECM 10 used in operating the engine system 20, various sensors that sense engine state and engine subsystem state used in controlling and reporting the state of the engine system 20, various actuators that operate components of the engine subsystems, an engine power generator that generates energy for operation of the engine, and wiring and associated connectors that provide signals and power to actuators, sensors, and engine subsystems.

The ancillary systems 32 include other systems not directly involved in the operation of the engine 22, but otherwise related to the engine 22, for example, a transmission, a clutch mechanism, a load driven by the engine, such as a generator or pump, the structure supporting the engine, such as a skid or a vehicle, and the structure supporting the various subsystems, such as mounting brackets and other supports.

Referring to FIGS. 1 and 2, the memory 14 of the ECM 10 is adapted to store instructions for the processor 12 to operate the various engine subsystems in concert to operate the engine system 20. In one instance, the instructions can include instructions adapted to enable the ECM 10 to control the air to fuel ratio of the combustion mixture supplied to the engine 22 in relation to engine loading. The processor 12 operates according to the instructions to signal one or more components of the fuel system, such as fuel injectors, a fuel pressure regulator and/or an adjustable air-gas mixer, via the I/O interface 16 to control the air to fuel ratio of the combustion mixture supplied to the engine. The instructions may additionally or alternatively include instructions adapted to enable the ECM 10 to control the amount of combustion mixture supplied to the engine 22, for example, with processor 12 operating to signal one or more components of the intake system, such as a throttle valve, via the I/O interface 16. The instructions may additionally or alternatively include instructions adapted to enable the ECM 10 to control ignition of the combustion mixture, for example, with processor 12 operating to signal one or more components of the electrical system, such as a coil in a spark plug ignited engine, or one or more components of the fuel system, such as pilot fuel injectors in a micro-pilot ignited engine. Providing other types of instructions on the memory 14 is within the scope of the invention.

As will be described in more detail below, the ECM 10 is also used apart from use in operating the engine system 20 to communicate information relating to the manufacturing of the engine system 20. To this end, the ECM 10 can be used to store build instructions (i.e. instructions for building the engine system 20) for part or all of the engine system 20, and the build instructions can be retrieved from the ECM 10 concurrently with manufacturing the engine system 20. Further, concurrently with manufacture of the engine system 20 or after the engine system 20 is completed, the ECM 10 can be used to store as-built information about the engine system 20. The build instructions and as-built information can be stored in the memory 14 of the ECM 10.

The ECM 10 may be a conventional ECM 10 or may be specially adapted for use in communicating information relating to the manufacturing of the engine system 20. For example, the ECM 10 can be specially adapted to include a larger memory 14 capacity than necessary or than would otherwise be provided for an ECM 10 used in operating the engine system 20. The memory 14 can include instructions for the processor 12 that facilitate storing and accessing build instructions and as-built information. For example, the instructions can enable the processor 12 to set up and maintain a database of the build instructions and as-built information, format the instructions and information, and operate a communications link between the ECM 10 and an external device used in inputting and retrieving the instructions and information. The ECM 10 may be specially adapted in that it is configured to enable direct access to the memory 14 via the I/O interface 16 rather than using the processor 12 in accessing the memory 14 or otherwise configured to facilitate accessing the memory 14 from outside of the ECM 10. The ECM 10 may be specially adapted in that it is provided with additional types of I/O 16 interfaces than normally used in communicating with the engine system subsystems. For example, if the ECM 10 communicates with the engine system subsystems via a specialized ECM multi-wire I/O interface, the ECM 10 can additionally provide another type of multi-wire I/O interface, such as an RS-232 standard or universal serial bus standard port, a fiber optic port, or an I/O interface for wireless communication, such as an infrared port or radio frequency transponder. Further, as the protocol through which the ECM 10 communicates via the specialized ECM multi-wire I/O interface may be specific to the components communicated with and can vary from wire to wire according to the component on the communication wire, the ECM 10 can be configured to communicate through the additional types of I/O interface ports in a standardized protocol, for example, RS-232, IrDA, or TIA standard. If the ECM 10 is not provided with an additional port beyond that used in communicating with the components of the engine subsystems, the ECM 10 can be configured to communicate build instructions and as-built information via a standard or non-standard protocol through the specialized ECM multiwire I/O interface port.

It is also within the scope of the invention to include an adapter module 34 (FIG. 4B) adapted to communicate with the I/O interface 16 of the ECM 10, such as through the specialized ECM multi-wire I/O interface port or one of the additional ports, to enable the ECM 10 communicate in a manner that it is not configured to communicate. For example, use of an adapter module 34 enables an ECM to communicate wirelessly, such as via infrared or radio frequency, without providing such a transponder within the ECM 10 itself. As ECMs are not normally provided with provisions for wireless communications, use of an adapter module 34 enables wireless communications with the ECM without providing a specialized ECM for use in the system described herein.

Because of the large number of components and complexity of manufacturing an engine system 20, build instructions are provided to the workers and/or machines involved in the manufacture of the engine systems 20. Components of the engine subsystems, as well as the engine 22 and components thereof, may vary from engine system 20 to engine system 20. Therefore, in an instance where different engine systems 20 are manufactured in the same manufacturing space, build instructions for each particular engine system 20 being manufactured or groups of similar engine system configurations are provided to the workers and/or machines involved in manufacturing the engine systems 20. The build instructions include various information used in manufacturing the engine system 20, and can include instructions for the entire engine system or for one or more of the engine system subsystems. Some exemplary types of build instructions include a bill of materials, manufacturing drawings, general manufacturing instructions, manufacturing instructions specific to the particular engine system being manufactured, and worker or station specific instructions. It is also within the scope of the invention that the build instructions include instructions concerning what as-built information (discussed below) to collect.

A bill of materials includes a listing identifying the parts and materials used in manufacturing the engine system or subsystem. The listing may be broken down to correspond to discrete steps in the manufacture of the engine system and include a description of each part or material and the quantity of each part or material needed to complete the step. For example, a bill of materials relating to manufacturing the engine 22 may specify such details as the number, size, type, and grade of fasteners, nuts and washers required in assembling the engine, as well as larger details such as identifying a particular block casting that will be machined and included into the engine system. It is within the scope of the invention to include additional or different information on the bill of materials.

Manufacturing drawings graphically depict parts to be manufactured or assembled into the engine system 20. The drawings may include identification of the parts (ex. by serial number or by make and model) or materials, as well as manufacturing dimensions and tolerances, torque specifications for fasteners, and weld information. It is within the scope of the invention to include additional or different information on the manufacturing drawings.

General manufacturing instructions include instructions that are generally applicable to manufacturing engine systems or engine systems having a similar configuration. For example, the general manufacturing instructions can indicate machining tolerances and procedures, the order of assembly of components, the relative placement and clearance dimensions of components, and torque specifications for fasteners. The general manufacturing instructions may also include, for example, instructions of particular quality control steps (dimensional checks, material property verifications, checks to verify the engine system was manufactured according to the build instructions, etc.) to be performed on the engine system during manufacture. Manufacturing instructions specific to the particular engine system being manufactured are important when the particular engine system 20 deviates from the general manufacturing instructions for engine systems having a similar configuration. For example, a particular engine system 20 being manufactured may include optional or additional components or necessitate different treatment from other similar engine systems. It is within the scope of the invention to include additional or different information in the general or particular engine system specific manufacturing instructions.

It is also within the scope of the invention that the general and particular engine system specific manufacturing instructions include instructions for use by machines in manufacturing the engine system. The instructions can be adapted to be input directly into the machine in a format that the machine can use to perform a step in manufacturing or be instructions for the worker to input information into the machine. For example, if the manufacture of the engine system involves a computerized numerical control (CNC) mill, the manufacturing instructions can include a program to be uploaded into the mill to perform a machining step or instructions for use by a worker detailing the information to be input into the CNC mill.

Worker or station specific instructions include instructions related to a particular worker or a particular station in the manufacturing of the engine system 20. For example, at a manufacturing site having more that one station or more than one worker for performing a step in the manufacture of the engine system 20, the worker or station specific instructions may specify which worker or station will perform the step and where the ECM and engine system being manufactured should be delivered next. In another example, the same step may be performed by different machines at different stations. In this instance, the worker or station specific instructions may include special instructions on performing the step with the specific machine. It is within the scope of the invention to include additional or different information in the worker or station specific instructions.

As the engine system 20 is being manufactured or after it is complete, as-built information about the engine system 20 can be collected. The as-built information includes information specific to a particular completed engine system 20. The as-built information can include dimensional information about the particular completed engine system 20. For example, many components of the engine system 20 are manufactured to dimensions within a dimensional tolerance range. Thus, as the actual dimensions of the completed component can vary, the actual dimensions can be collected as as-built information. The as-built information can include information about how the engine system 20 was manufactured. For example, in a manufacturing space with more than one station or more than one worker who can perform a particular step, the as-built information can include information about which station or which worker performed which of the steps in manufacturing the engine system 20. In another example, the as-built information can include time and date information for particular steps to enable later determining information, such as which worker performed what step. The time and date information may also or alternatively provide information on the duration of each step. The as-built information can include information specifically identifying, for example by serial number or by lot and run information, components assembled into the engine system 20. The as-built information can include information about quality control checks performed on the engine system 20, such as whether the quality control check was passed or failed and any remedial action taken. The as-built information can include information indicating which steps in the manufacturing process are completed and which remain. Such information, for example, if monitored during manufacturing can enable ready determination of the status of the engine system and used in estimating time to completion. It is within the scope of the invention to include different or additional information in the as-built information. The as-built information can include test data from tests performed on the engine system 20. For example, when enough of the engine is manufactured for the engine system or portions of the engine system to be operated, the operation can be tested on a test cell. Information collected during testing on the test cell, such as performance data, alarm data, and knock signatures, can be stored as as-built information.

Figure 3:
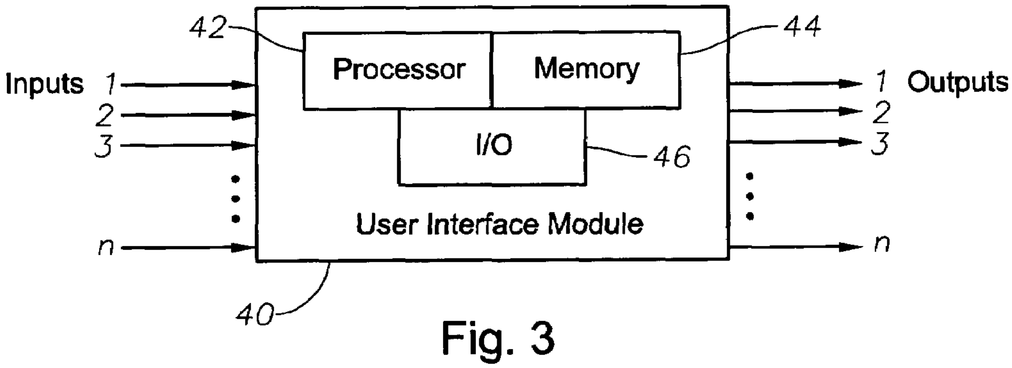
FIG. 3 schematically depicts a user interface module in accordance with the invention.

Referring to FIG. 3, a user interface module 40 can be provided to enable a worker to interface with the ECM 10. The user interface module 40 according to the invention includes a processor 42 operably coupled to a computer readable medium or memory 44. The computer readable medium 44 may be wholly or partially removable from the user interface module 40. The computer readable medium 44 contains instructions used by the processor 42 to operate as described herein. The user interface module 40 can receive one or more input signals ($input_1 \ldots input_n$) and can output one or more output signals ($output_1 \ldots output_n$) via an I/O interface 46 coupled to at least one of the processor 42 and the memory 44. The I/O interface 46 can include interfaces for communicating with a user (i.e. a worker), such as a keypad, display screen, touch screen, and speaker and/or microphone, as well as interfaces for communicating with the ECM 10, such as a wired communications port or wireless transponder.

The memory 44 can include instructions for the processor 42 that enable the user interface module 40 to interface and communicate data with the ECM 10 via the I/O interface 46. The instructions also enable communicating with a user (i.e. a worker) via the I/O interface 46, such as by text, a graphical user interface (GUI), or audio.

For communicating with the ECM 10, the I/O interface 46 can include a port corresponding to a port provided on the ECM 10. For example, if the ECM 10 is provided with a specialized ECM multi-wire I/O interface port, the I/O interface 46 can include a port adapted to communicate with the specialized ECM multi-wire I/O interface port of the ECM 10 via a cable. In another example, if the ECM 10 includes a wired I/O interface, such as an RS-232 standard or universal serial bus standard port, a fiber optic port, or an I/O interface for wireless communication, the I/O interface 46 can include an interface adapted to communicate with the wired or wireless interface.

The user interface module may be a handheld device or may be larger and reside or be affixed at a particular manufacturing station. The user interface module can have provisions to identify the worker using the device. For example, the user interface module can require a login to identify a particular worker. The user interface module can have provisions to identify the station at which it is being used. For example, the user interface module can prompt the worker to enter a station identifier.

Figure 4A:
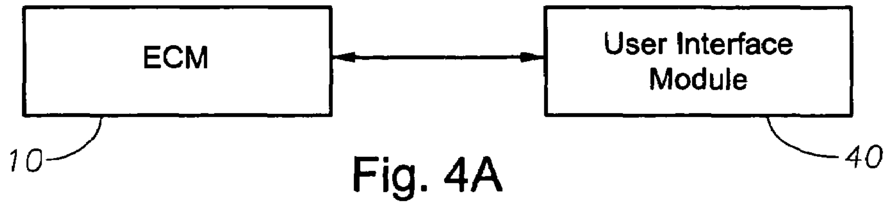
FIGS. 4A and 4B schematically depict communication between the ECM of FIG. 1 and the user interface module of FIG. 3 directly (FIG. 4A) or through an adapter module (FIG. 4B)
Figure 4B:
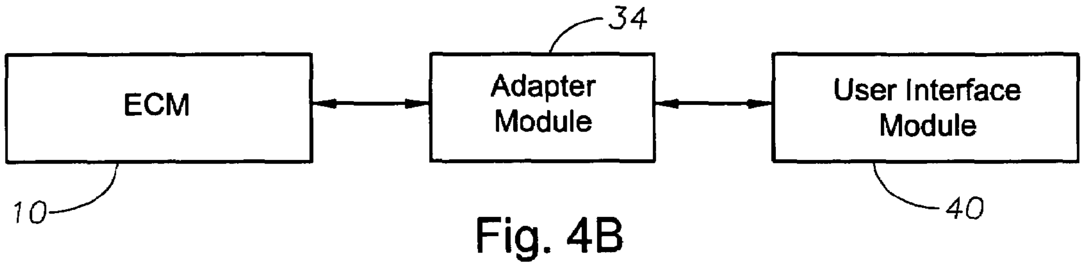

FIGS. 4A and 4B depict wired or wireless communication between the ECM 10 and the user interface module 40. FIG. 4A depicts direct communication between the ECM 10 and the user interface module 40, and FIG. 4B depicts communication between the ECM and user interface module 40 using an adapter module 34 (discussed above) coupled to the ECM 10.

Figure 5:
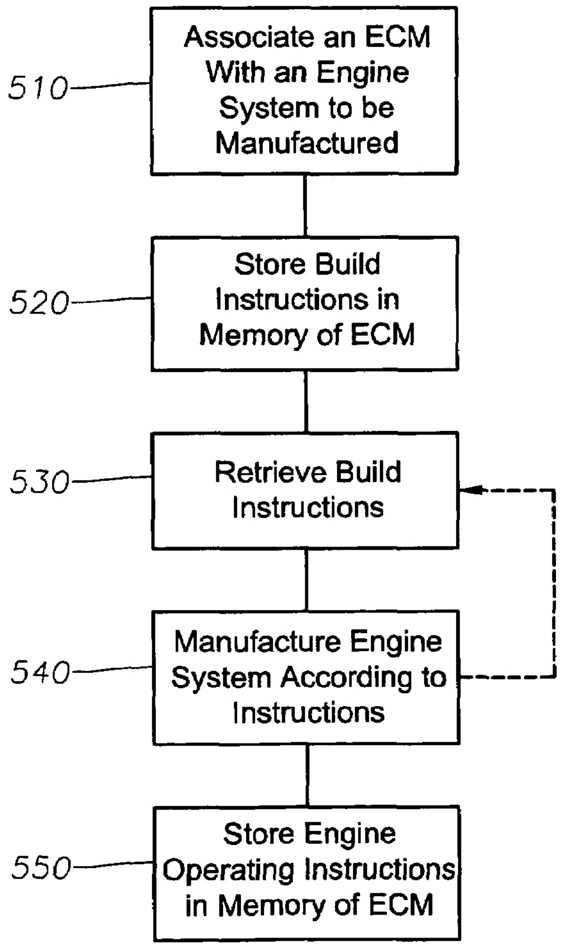
FIG. 5 is a flow diagram depicting a method of using an ECM to communicate build instructions in accordance with the invention.

An illustrative method in accordance with the invention is depicted in the flow diagram of FIG. 5. According to the illustrative method, the ECM is used in communicating build instructions for use in building an engine system. At block 510 a particular ECM is associated with an engine system to be built, for example, by associating a serial number of the particular ECM with specifications of a particular engine or an engine system serial number in a database. At block 520, build instructions are stored in the memory of the ECM. As described above, the build instructions can include various information useful in manufacturing the engine system, for example a bill of materials, manufacturing drawings, general manufacturing instructions, manufacturing instructions specific to the particular engine system being manufactured, worker or station specific instructions, and other information. The build instructions can relate to the entire manufacture of the engine system or can relate only to a subset of steps related to manufacturing the engine system. In one instance, it may be desirable to distribute manufacturing instructions, such as general manufacturing instructions, in a conventional manner and provide the ECM with only manufacturing instructions specific to the particular engine system being manufactured.

If the engine system is manufactured at a single station, the ECM is provided to the station. If the engine system is manufactured at multiple stations, the ECM is provided to the first station. At block 530, the worker or workers associated with the station retrieve the build instructions from the ECM, and at 540 manufacture the engine system according to the build instructions. In an instance where the engine system is manufactured at multiple stations, the worker or workers associated with the station may retrieve only the build instructions pertinent to their assigned station. The ECM is passed to subsequent stations together with the engine system. Blocks 530, retrieve build instructions, and 540, manufacture engine system according to instructions, are repeated at each station until the engine system is complete. If the ECM does not contain instructions for a particular step in manufacture of the engine system, then the station associated with the step may receive the ECM, optionally query the ECM to determine if build instructions for the particular step have been stored on the ECM, and not retrieve build instructions (i.e. omit the task at block 530).

Communications, such as querying the ECM and receiving the build instructions can be performed with a user interface module, such as that discussed above. The instructions for a worker can be displayed on a display of the user interface module, called out audibly, and/or printed on a printer associated with the user interface module. Also, as mentioned above, build instructions can also be communicated to a machine used in the manufacturing. The instructions for the machine can be retrieved and communicated directly to the machine, or the instructions can be communicated to the worker as described above and the worker can then relay the instructions to the machine. In an instance where communications with the ECM are to take place over a wired connection, the worker may couple the user interface module or machine used in manufacture to the ECM via a cable to retrieve build instructions (block 530). In an instance where communications with the ECM are to take place wirelessly, the workers may maintain the user interface module in a vicinity of the ECM or the machine used in manufacture may be positioned to receive the wireless communication including the build instructions. In an instance where communications with the ECM are to take place in a manner that the ECM is not configured to communicate, for example wireless communications with an ECM that does not include a wireless transponder or communications on a standardized communications port with an ECM that does not include the specific standardized port, the ECM can be coupled to an adapter module. The adapter module can be coupled to the ECM, for example, prior to the first station or at the first station and travel with the ECM from station to station, or an adapter module can be provided at each station and coupled to the ECM each time the ECM is queried for build instructions.

During the manufacture of the engine system, the ECM will be installed into the engine system. When the engine system is complete or at some time during the manufacture of the engine system, such as when the portion of the manufacture of the engine system for which the ECM contains build instructions are complete, the engine operating instructions can be stored in the memory of the ECM (block 550). If desired, or if required to free up memory for the engine operating instructions, the build instructions can be deleted from the memory of the ECM. It is anticipated that the build instructions could remain in the ECM for subsequent reference, for example by a worker servicing the engine system after the engine system has operated in its installed application. It is also within the scope of the invention to include additional information in the memory of the ECM that may later be useful to such a worker, for example, repair instructions.

Figure 6:
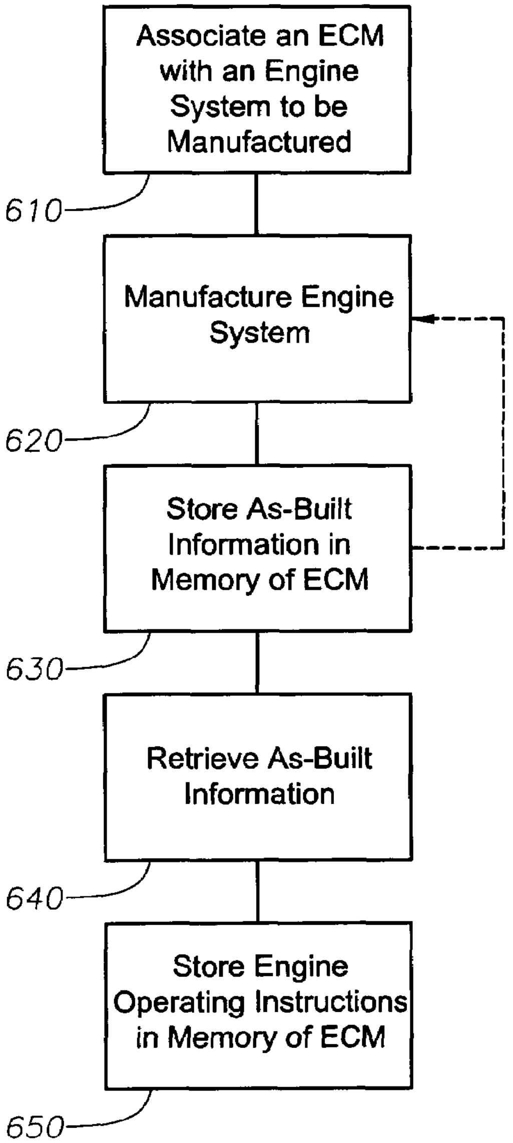
FIG. 6 is a flow diagram depicting a method of using an ECM to communicate as-built information in accordance with the invention.

In another illustrative method in accordance with the invention, the ECM is used in communicating as-built information relating to the manufacture of the engine system (FIG. 6). At block 610 a particular ECM is associated with an engine system to be built, for example, by associating a serial number of the particular ECM with specifications of a particular engine or an engine system serial number in a database.

If the engine system is manufactured at a single station, the ECM is provided to the station. If the engine system is manufactured at multiple stations, the ECM is provided to the first station in the manufacturing process. At block 620, the worker or machines associated with the station manufacture the engine system, and at block 630 the workers store as-built information relating to the engine system being manufactured. As discussed above, the as-built information contains information about the manufacture of the engine system as it is being manufactured and when it is completed. The as-built information can include, for example, dimensional information about the engine system, information about how the engine system was manufactured, information about which station or worker performed which of the steps in manufacturing the engine system, time and date information for particular steps in manufacturing the engine system, information specifically identifying components assembled into the engine system, information on quality control checks performed on the engine system, and other information.

In an instance where the engine system is manufactured at multiple stations, the worker or workers associated with the station may store as-built information pertinent to their assigned station and pertinent to all or fewer than all of the steps performed at the station. As each station completes its part in the manufacturing, the ECM is passed to subsequent stations together with the portions of the manufactured engine system. Block 620, manufacture engine system, and block 630, store as-built information in the memory of the ECM, are repeated at each station until the engine system is complete. If no as-built information is requested at particular station or of a worker, the worker may omit the task at block 630 of storing as-built information in the memory of the ECM.

Communications with the ECM, such as storing as-built information, can be performed with the user interface module similarly as described above with respect to retrieving build instructions. The user interface module can prompt the worker for specific information, for example on a display of the user interface module, called out audibly, and/or printed on a printer associated with the user interface module. The user can then enter the as-built information into the user interface module, for example with a keypad of the user interface module, with a touch sensitive display of the user interface module, or audibly.

As above, in an instance where the communications with the ECM take place over a wired connection, the worker may couple the user interface module to the ECM via a cable to perform the task at block 630 of storing as-built information. In an instance where communications with the ECM take place wirelessly, the worker may maintain the user interface module in a vicinity of the ECM to receive the wireless communication including the as-built information. In an instance where communications with the ECM take place in a manner that the ECM is not configured communicate, the ECM can be coupled to an adapter module. The adapter module can be coupled to the ECM, for example, prior to the first station or at the first station and travel with the ECM from station to station, or an adapter module can be provided at each station and coupled to the ECM each time as-built information is to be stored in the ECM.

At block 640, the as-built information can be retrieved from the ECM. The as-built information can be retrieved at the end of each step during the manufacturing of the engine system, at other intervals during the manufacturing of the engine, or at the end of the manufacturing of the engine system. Retrieving the as-built information during the manufacturing of the engine system enables the status of the engine system's manufacture to be monitored, for example to determine what manufacturing steps have been completed, what problems have been encountered, who has been involved in the manufacture of the engine system, and other information. The as-built information can be retrieved with a user interface module as described above, or with another device.

It is anticipated that the retrieved as-built information be stored outside of the ECM for later use, such as in a database associated with the particular engine system, in a database with as-built information from other engine systems, or in an other manner. The stored as-built information is helpful in analyzing the manufacturing of the engine system. For example, time and date information can be used to analyze the time taken by various steps or compare relative time between stations performing the same manufacturing step for use in increasing the efficiency of the manufacturing process. In another example, worker or station information, dimensional information, quality control information, and other information collected during the manufacturing of an engine system may be useful later in analyzing an operational failure of an engine system, and such information can also be useful in preventing further failures of other similar engine systems.

When the engine system is complete or during the manufacture of the engine system, such as when all desired as-built information has been collected, the engine operating instructions can be stored in the memory of the ECM (block 650). If desired, or if required to free up memory for the engine operating instructions, the as-built information can be deleted from the memory of the ECM. It is anticipated that the as-built information could remain in the ECM for subsequent reference, for example, by a worker servicing the engine system that has operated in its installed application or by the manufacturer when the engine system is returned for refurbishing.

Figure 7:
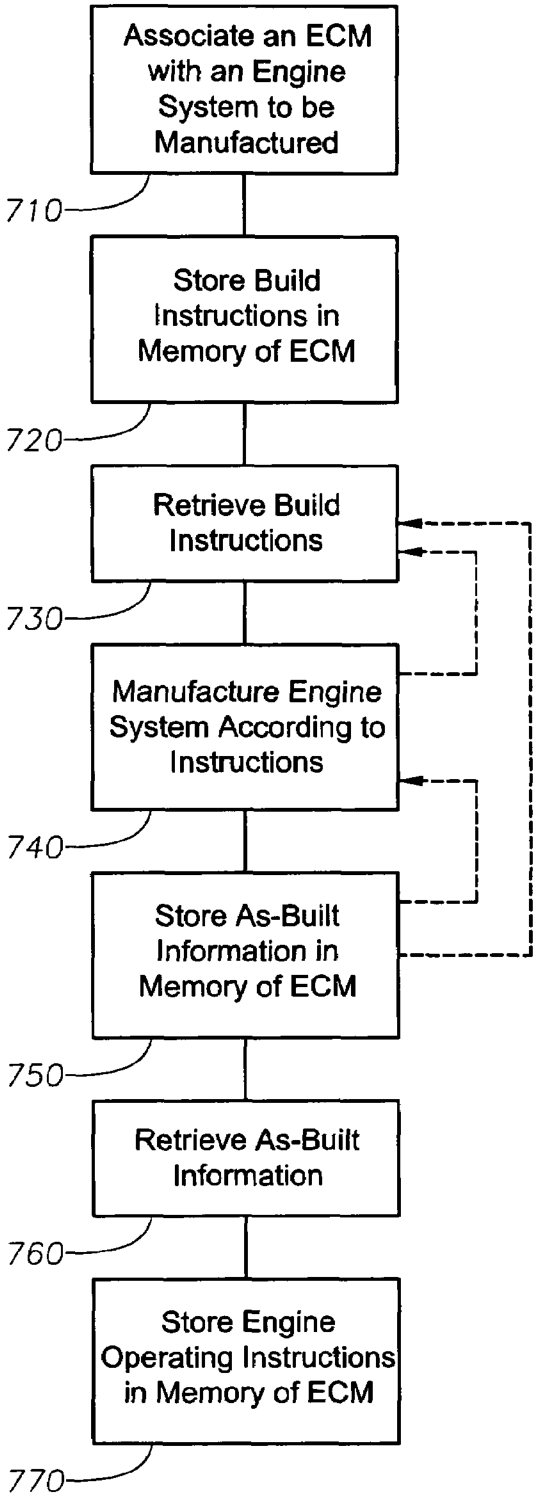
FIG. 7 is a flow diagram depicting a method of using an ECM to communicate build instructions and as-built information in accordance with the invention.

In an illustrative method in accordance with the invention, depicted in the flow diagram of FIG. 7, the ECM is used both in communicating build instructions for use in building an engine system and as-built information relating to the manufacture of the engine system. At block 710 a particular ECM is associated with an engine system to be built as discussed above. At block 720, build instructions for the entire manufacturing process or as subset of steps in the manufacturing process are stored in the memory of the ECM.

If the engine system is manufactured at a single station, the ECM is provided to the station. If the engine system is manufactured at multiple stations, the ECM is provided to the first station. At block 730, the worker or workers associated with the station or first station retrieve the build instructions, or a portion of the build instructions (such as those pertinent to the station), from the ECM, and at block 740 manufacture the engine system is manufactured according to the build instructions. At 750, the worker or machines associated with the station store as-built information relating to the engine system being manufactured in the memory of the ECM. In an instance where the engine system is manufactured at multiple stations, the ECM is passed to subsequent stations together with the portions of the manufactured engine system. Blocks 730–750 are repeated at each station until the engine system is complete. Either of block 730 or block 750 can be omitted at a station if no build instructions are provided for the station (thus omit block 730) or if no as-built information is collected at the station (thus omit block 750).

At block 760, the as-built information can be retrieved from the ECM, and a copy left in the memory of the ECM or the information deleted from the memory of the ECM. Likewise, the build instructions can remain in the memory of the ECM or be deleted from the memory of the ECM. Additional information, for example repair instructions, can be stored in the memory of the ECM.

When the engine system is complete or some time during the manufacture of the engine system, the engine operating instructions can be stored in the memory of the ECM (block 770). Of note, the ECM can be incorporated into the engine system during the manufacture or another ECM can be incorporated into the engine system, and the ECM used in manufacture re-used. In an instance where the ECM used in manufacture is not incorporated into the engine system, the engine operating instructions can be stored in the memory of the ECM that will be incorporated into the engine system.

An advantage of the invention is that instructions and information related to manufacturing an engine system can be conveniently communicated in a single instrument, the engine control module (ECM). More so, the ECM is part of the engine system itself.

Another advantage of the invention is that the as-built information collected from the manufacture of the engine system is collected in electronic format. The information in electronic format is easily transferable from the ECM to other devices without necessitating conversion between media types and errors that can stem from conversion. For example as-built data recorded in a paper logbook would require conversion to an electronic format for storage in a computer database and could suffer transcription errors. Also, because the as-built information is initially collected in electronic format, the data can be conditioned (ex. normalized for use in an computer database) as it is being entered, and transfer from ECM to other devices is almost instantaneous.

It is within the scope of the invention to apply the concepts described herein to manufacture numerous other devices and systems and/or using other memory stores than an ECM. For example, the concepts described herein may be applied to manufacture of consumer or industrial electronic devices using the memory of the electronic device for storage of manufacturing information. In another instance, the ECM may be used as for storage of manufacturing information for a device or system that will not ultimately be incorporated into the engine system. In lieu of an ECM, it is within the scope of the invention to use a generic computer and memory (such as a PC based microcomputer, personal digital assistant, or personal storage device) or a computer specifically designed or adapted for use in storing manufacturing information. Numerous variations using the ECM, general computer, or specially adapted computer for storage of manufacturing information of engine systems or subcomponents thereof or devices or systems apart from the engine system and subcomponents thereof are thus anticipated.

A number of embodiments of the invention have been described. Nevertheless, it will be understood that various modifications may be made without departing from the spirit and scope of the invention. Accordingly, other embodiments are within the scope of the following claims.

What is claimed is:

1. A method of manufacturing an engine system, comprising:

associating an engine control module with a particular engine system;

storing information concerning at least one of manufacturing instructions for manufacturing the engine system and as-built information about the particular engine system in a memory of the engine control module; and storing engine system operating instructions in a memory of the engine control module, the engine system operating instructions operable to enable the engine control module to control one or more aspects of the engine system operation.

2. The method of claim 1 wherein storing instructions for manufacturing the engine system comprises storing at least one of a list of parts for the engine system, general manufacturing instructions for engine systems having similar characteristics, manufacturing instructions for the particular engine system being manufactured, worker specific instructions, and manufacturing station specific instructions.

3. The method of claim 1 further comprising:

retrieving at least a portion of the manufacturing instructions; and manufacturing the engine system according to the instructions.

4. The method of claim 3 wherein retrieving at least a portion of the manufacturing instructions comprises retrieving at least a portion of the manufacturing instructions with a user interface device via a wireless connection to the engine control module.

5. The method of claim 4 wherein the engine control module is provided without a wireless transponder and the method further comprises coupling a wireless adapter to the engine control module adapted to enable the engine control module to communicate with the user interface device via the wireless connection.

6. The method of claim 4 wherein retrieving at least a portion of the manufacturing instructions comprises communicating instructions from the engine control module to a machine that performs at least part of a manufacturing step.

7. The method of claim 3 wherein retrieving at least a portion of the manufacturing instructions is performed at least one of prior to manufacturing the engine system and concurrently with manufacturing the engine system.

8. The method of claim 1 further comprising deleting the manufacturing instructions prior to storing the engine operating instructions.

9. The method of claim 1 wherein storing as-built information is performed concurrently with manufacturing the engine system.

10. The method of claim 1 wherein storing as-built information comprises storing at least one of dimensional information about the engine system, information about how the engine system was manufactured, information about which station or worker performed which of the steps in manufacturing the engine system, time and date information for particular steps in manufacturing the engine system, information specifically identifying components incorporated into the engine system, and information on quality control checks performed on the engine system.

11. The method of claim 1 further comprising retrieving the as-built information at least one of concurrently with manufacturing the engine system and after manufacturing the engine system.

12. The method of claim 1 further comprising retrieving the as-built information and maintaining it in a database external to the engine control module as a record of the particular engine system.

13. The method of claim 1 wherein the engine system comprises at least one of an engine, an intake system, a fuel system, an exhaust system, an electrical system, and ancillary systems.

14. The method of claim 1 wherein storing engine system operating instructions in a memory of the engine control module is performed prior to storing information concerning as-built information about the particular engine system in the memory of the engine control module.

15. The method of claim 1 wherein storing engine system operating instructions in a memory of the engine control module is performed concurrently with storing information concerning manufacturing instructions for the particular engine system in the memory of the engine control module.

16. A method of manufacturing an engine system, comprising:

associating an engine control module with a particular engine system;

storing build instructions relating to manufacturing the particular engine system in a memory of the engine control module;

retrieving at least a portion of the build instructions from the engine control module; and manufacturing the particular engine system according to the retrieved build instructions.

17. The method of claim 16 wherein storing build instructions comprises storing at least one of a list of parts for the engine system, general manufacturing instructions for engine systems having similar characteristics, manufacturing instructions for the particular engine system being manufactured, worker specific instructions, and manufacturing station specific instructions.

18. The method of claim 16 wherein retrieving at least a portion of the build instructions comprises retrieving at least a portion of the build instructions with a user interface device via a wireless connection to the engine control module.

19. The method of claim 18 wherein the engine control module is provided without a wireless transponder and the method further comprises coupling a wireless adapter to the engine control module adapted to enable the engine control module to communicate with the user interface device via the wireless connection.

20. The method of claim 16 wherein retrieving at least a portion of the build instructions comprises communicating instructions from the engine control module to a machine that performs at least part of a manufacturing step.

21. The method of claim 16 wherein retrieving at least a portion of the build instructions is performed at least one of prior to manufacturing the engine system and concurrently with manufacturing the engine system.

22. The method of claim 16 further comprising storing engine system operating instructions in the memory of the engine control module, the engine system operating instructions operable to enable the engine control module to control one or more aspects of the engine system operation.

23. The method of claim 22 further comprising deleting the build instructions prior to storing the engine system operating instructions.

24. The method of claim 22 further comprising storing as-built information about the particular engine system concurrently with manufacturing the engine system.

25. The method of claim 24 further comprising retrieving the as-built information.

26. The method of claim 16 further comprising assembling the engine control module into the engine system.

27. A method of manufacturing an engine system, comprising:

associating an engine control module with a particular engine system;

manufacturing the engine system;

concurrently with manufacturing the engine system, storing as-built information related to the manufacture of the engine system in a memory of the engine control module.

28. The method of claim 27 wherein storing as-built information comprises storing at least one of dimensional information about the engine system, information about how the engine system was manufactured, information about which station or worker performed which of the steps in manufacturing the engine system, time and date information for particular steps in manufacturing the engine system, information specifically identifying components incorporated into the engine system, and information on quality control checks performed on the engine system.

29. The method of claim 28 wherein storing as-built information comprises storing as-built information with a user interface device via a wireless connection to the engine control module.

30. The method of claim 29 wherein the engine control module is provided without a wireless transponder and the method further comprises coupling a wireless adapter to the engine control module adapted to enable the engine control module to communicate with the user interface device via the wireless connection.

31. The method of claim 27 wherein storing as-built information comprises communicating information between the engine control module and a machine that performs at least part of a manufacturing step.

32. The method of claim 27 further comprising retrieving at least a portion of the as-built information after the engine system is complete.

33. The method of claim 27 further comprising storing engine system operating instructions in the memory of the engine control module, the engine system operating instructions operable to enable the engine control module to control one or more aspect of the engine system operation.

34. The method of claim 33 further comprising deleting the as-built information prior to storing the engine operating instructions.

35. The method of claim 27 further comprising assembling the engine control module into the engine system.

36. The method of claim 27 further comprising storing instructions for manufacturing the engine system.

37. An engine control module comprising:

a memory; and a processor configured to perform operations, comprising:

associate the engine control module with a particular engine system;

store information concerning at least one of manufacturing instructions for manufacturing the engine system and as-built information about the engine system in the memory of the engine control module; and store engine system operating instructions in a memory of the engine control module, the engine system operating instructions operable to enable the engine control module to control one or more aspects of the engine system operation.

38. The engine control module of claim 37 wherein the processor is configured to store at least one of a list of parts for the engine system, general manufacturing instructions for engine systems having similar characteristics, manufacturing instructions for the particular engine system being manufactured, worker specific instructions, or manufacturing station specific instructions.

39. The engine control module of claim 37 further comprising an input/output interface adapted communicate at least a portion of the manufacturing instructions with a user interface device via a wireless connection.

40. The engine control module of claim 37 wherein the input/output interface is adapted to communicate at least a portion of the manufacturing instructions to a machine that performs at least part of a manufacturing step.

41. The engine control module of claim 37 wherein the processor is configured to store at least one of dimensional information about the engine system, information about how the engine system was manufactured, information about which station or worker performed which of the steps in manufacturing the engine system, time and date information for particular steps in manufacturing the engine system, information specifically identifying components incorporated into the engine system, and information on quality control checks performed on the engine system.

* * * * *